United States Patent
Sileno

(10) Patent No.: US 9,140,011 B2
(45) Date of Patent: Sep. 22, 2015

(54) PIPE BRACE

(71) Applicant: John Sileno, Mequon, WI (US)

(72) Inventor: John Sileno, Mequon, WI (US)

(*) Notice: Subject to any disclaimer, the term of this patent is extended or adjusted under 35 U.S.C. 154(b) by 0 days.

(21) Appl. No.: 14/447,312

(22) Filed: Jul. 30, 2014

(65) Prior Publication Data

US 2015/0033645 A1     Feb. 5, 2015

Related U.S. Application Data

(60) Provisional application No. 61/860,184, filed on Jul. 30, 2013.

(51) Int. Cl.
   *E04D 13/147*      (2006.01)
   *E04C 2/52*        (2006.01)
   *F16L 5/00*        (2006.01)
   *E04C 3/02*        (2006.01)

(52) U.S. Cl.
CPC . *E04C 2/521* (2013.01); *F16L 5/00* (2013.01); *E04C 2003/026* (2013.01)

(58) Field of Classification Search
CPC ... E04D 13/1476; F16L 5/00; E02D 29/1427; E03F 5/06; E04C 3/145
USPC ............................... 52/220.1, 220.8, 199, 219
See application file for complete search history.

(56) References Cited

U.S. PATENT DOCUMENTS

| | | |
|---|---|---|
| 3,034,185 A | 5/1962 | Olsen |
| 3,481,571 A | 12/1969 | Lauckner |
| 3,920,208 A | 11/1975 | Dowdy et al. |
| 3,979,093 A | 9/1976 | Madden |
| 4,050,205 A | 9/1977 | Ligda |
| 4,192,477 A | 3/1980 | Decky et al. |
| 4,526,407 A * | 7/1985 | Kifer ............................... 285/42 |
| 5,036,636 A * | 8/1991 | Hasty ............................. 52/100 |
| 5,595,453 A | 1/1997 | Nattel et al. |
| 5,702,076 A | 12/1997 | Humber |
| 5,860,256 A * | 1/1999 | Humber ......................... 52/219 |
| 6,211,465 B1 | 4/2001 | Streit |
| 6,598,835 B2 | 7/2003 | Minnick |

(Continued)

FOREIGN PATENT DOCUMENTS

| | | |
|---|---|---|
| DE | 3442074 | 7/1985 |
| EP | 0635665 | 1/1995 |

(Continued)

OTHER PUBLICATIONS

Admitted prior art available at least as early as Jul. 29, 2013, ERICO, "Stud Wall" accessories, product brochure, 20 pages.
Better Homes and Gardens—DIYadvice, the Do-It-Yourself-er's Guide to Home Improvement, "Framing an Interior Wall with Metal Studs," network site, downloaded on Aug. 10, 2013, 2 pages.

*Primary Examiner* — Jeanette E Chapman
*Assistant Examiner* — Daniel Kenny
(74) *Attorney, Agent, or Firm* — Michael Best & Friedrich LLP

(57) ABSTRACT

A pipe brace for securing a pipe passing through a frame of a wall. The pipe brace includes a structural member including a first wall defining an aperture and a second wall extending from the first wall, the first wall and the second wall at least partially defining a channel that receives at least a portion of the frame. A gasket engages a perimeter of the aperture in a press-fit relationship. The pipe may be inserted into the aperture from either a first side or a second side of the aperture, and the gasket forms an air-tight seal with pipe to inhibit airflow.

20 Claims, 6 Drawing Sheets

(56) References Cited

U.S. PATENT DOCUMENTS

| | | |
|---|---|---|
| 6,935,079 B1 | 8/2005 | Julian et al. |
| 8,082,701 B1 | 12/2011 | Wendel |
| 8,453,389 B2 * | 6/2013 | Selke et al. ............... 52/58 |
| 2009/0045301 A1 | 2/2009 | Collins |
| 2011/0078975 A1 | 4/2011 | Spruiell |
| 2012/0012347 A1 | 1/2012 | Zernach et al. |

FOREIGN PATENT DOCUMENTS

| | | |
|---|---|---|
| GB | 2463070 | 3/2010 |
| WO | 9324712 | 12/1993 |
| WO | 9835176 | 8/1998 |
| WO | 2007068788 | 6/2007 |

* cited by examiner

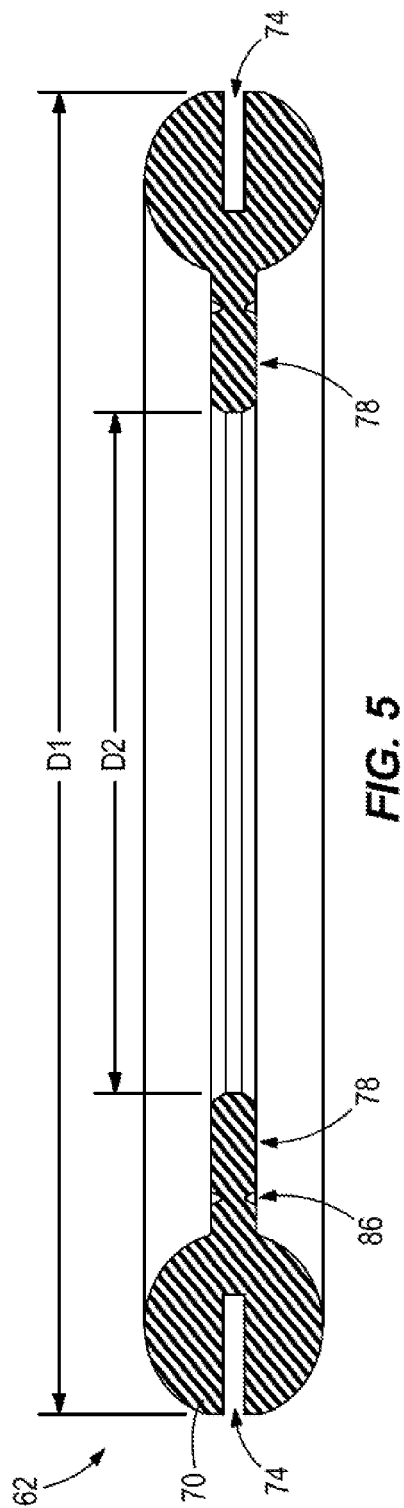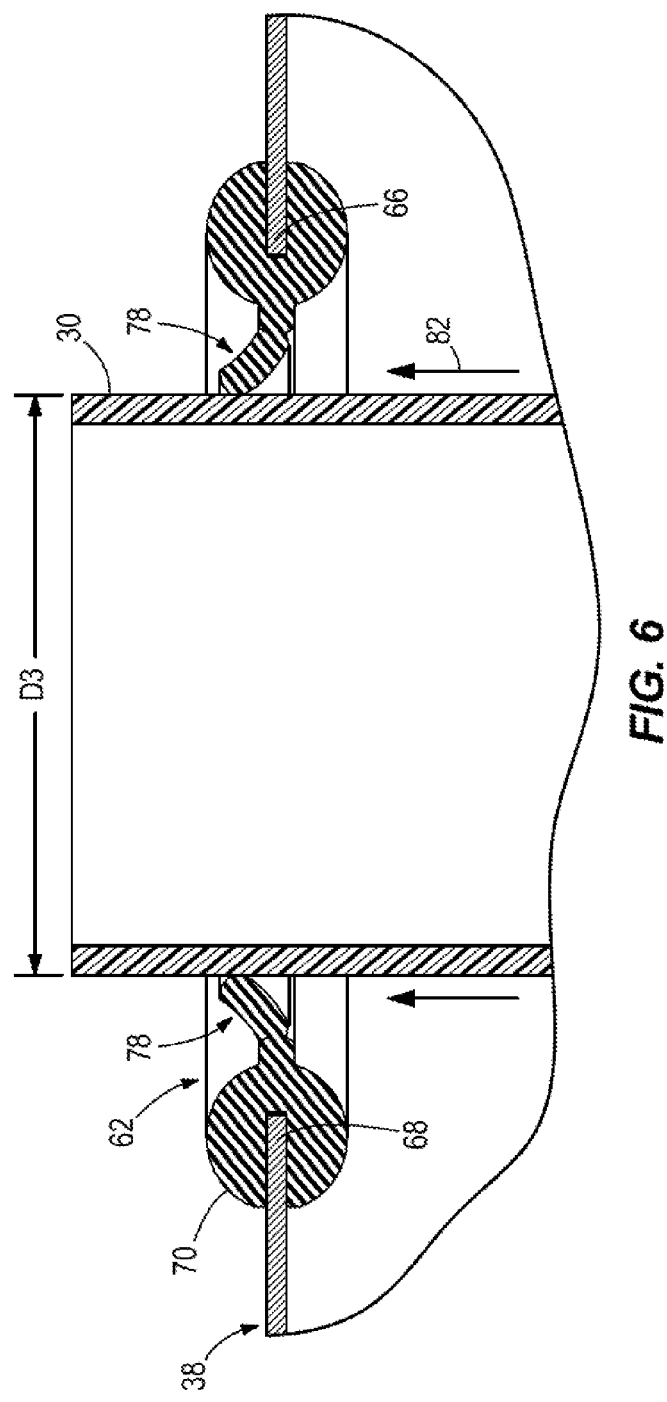

PIPE BRACE

CROSS-REFERENCE TO RELATED APPLICATIONS

This application claims priority to U.S. Provisional Patent Application No. 61/860,184, filed Jul. 30, 2013, the entire contents of which are hereby incorporated by reference.

BACKGROUND

The present invention relates to piping in wall frames, and more specifically, to securing piping in wall frames.

Various pipes (e.g., plumbing, electrical, vent, etc.) are snaked through wall frames within a building to provide a path for various substances or elements throughout the building. While locating these pipes within the wall frames, portions of the wall frames (e.g., headers) need to be cut to provide a gap for the pipes to be inserted. The pipes are free to move within these gaps and may cause unwanted noise from expansion between the piping and wood or other issues. Further, the gaps provide an airflow passage, which may be undesirable for fire prevention purposes.

SUMMARY

In one aspect, the invention provides a pipe brace for securing a pipe passing through a frame of a wall. The pipe brace includes a structural member including a first wall defining an aperture and a second wall extending from the first wall. The first wall and the second wall at least partially define a channel that receives at least a portion of the frame. A gasket engages a perimeter of the aperture in a press-fit relationship. The pipe may be inserted into the aperture from either a first side or a second side of the aperture, and the gasket forms an air-tight seal with pipe to inhibit airflow.

In another aspect, the invention provides a pipe brace for securing a pipe passing through a frame of a wall. The pipe brace includes a structural member including a first wall defining an aperture, a second wall and a third wall extending from the first wall. The first wall, the second wall, and the third wall at least partially define a channel that receives at least a portion of the frame. A gasket engages a perimeter of the aperture in a press-fit relationship and includes an annular main body having a circular cross-section and defining a recess that receives at least a portion of the first wall proximate the perimeter of the aperture to anchor the gasket within the aperture. The annular main body has an outer diameter greater than a diameter of the aperture. An annular flange extends radially inwardly from the annular main body and has an inner diameter less than an outer diameter of the pipe such that the annular flange is bent in an axial direction when the pipe is inserted into the aperture. The pipe may be inserted into the aperture from either a first side or a second side of the aperture, and the gasket forms an air-tight seal with pipe to inhibit airflow.

Other aspects of the invention will become apparent by consideration of the detailed description and accompanying drawings.

BRIEF DESCRIPTION OF THE DRAWINGS

FIG. 5 is a cross-sectional view of a gasket used in the pipe brace of FIG. 1.

FIG. 6 is a cross-sectional view of the gasket of FIG. 5, illustrating bending movement of an annular flange when a pipe is inserted from a bottom side.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
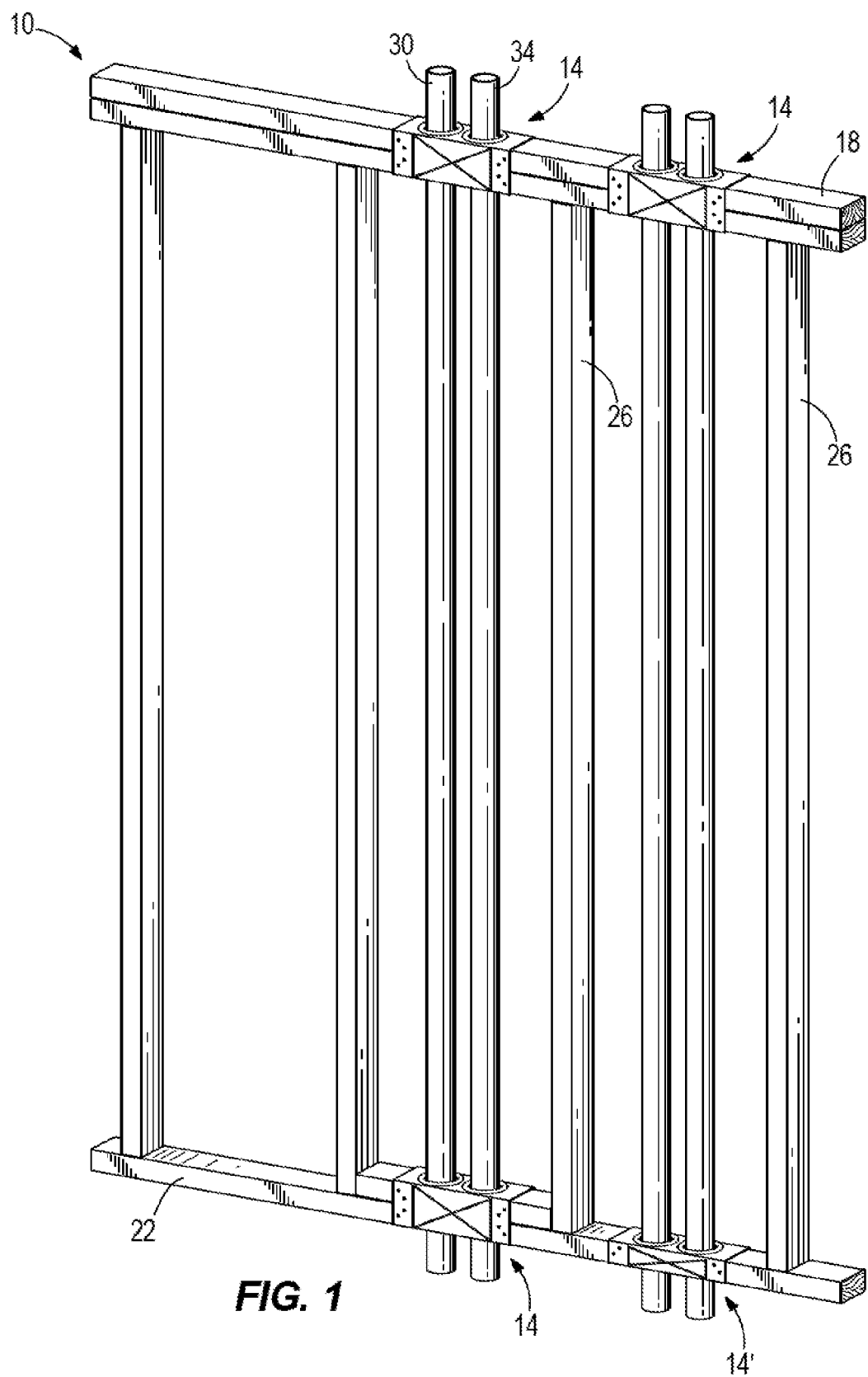
FIG. 1 is a perspective view of a portion of a wall frame including a pipe brace in accordance with an embodiment of the invention, illustrated holding two pipes having approximately the same diameter.

FIG. 1 illustrates a portion of a frame 10 of a building wall including two sets of pipe anchoring devices or braces 14, 14', each in accordance with an embodiment of the invention. The frame 10 includes a first horizontal support or top header 18, a second horizontal support or bottom header 22, and a plurality of vertical supports 26 extending between the top header 18 and the bottom header 22. The supports 18, 22, 26 include a plurality of 2"×4" wooden boards that are coupled (e.g., nailed, screwed, etc.) to each other to form the frame 10 and provide structural rigidity for the wall. In other embodiments, the supports 18, 22, 26 could be made from other sizes of boards or other framing elements. The frame 10 includes one or more cut-out sections (FIG. 4), through which a first pipe 30 and a second pipe 34 may be inserted for transporting various substances (e.g., water, exhaust gas, etc.) or providing a pathway for other components (e.g., electrical wiring) through the frame 10. The pipe braces 14, 14' are attached to desired locations along the top header 18 and bottom header 22 corresponding to the locations of the cut-out sections. The pipe brace 14 may be used in a portion of the frame 10 that includes two 2"×4" wooden boards, while the pipe brace 14' may be used in a different portion of the frame 10a that includes a single 2"×4" board.

Figure 2:
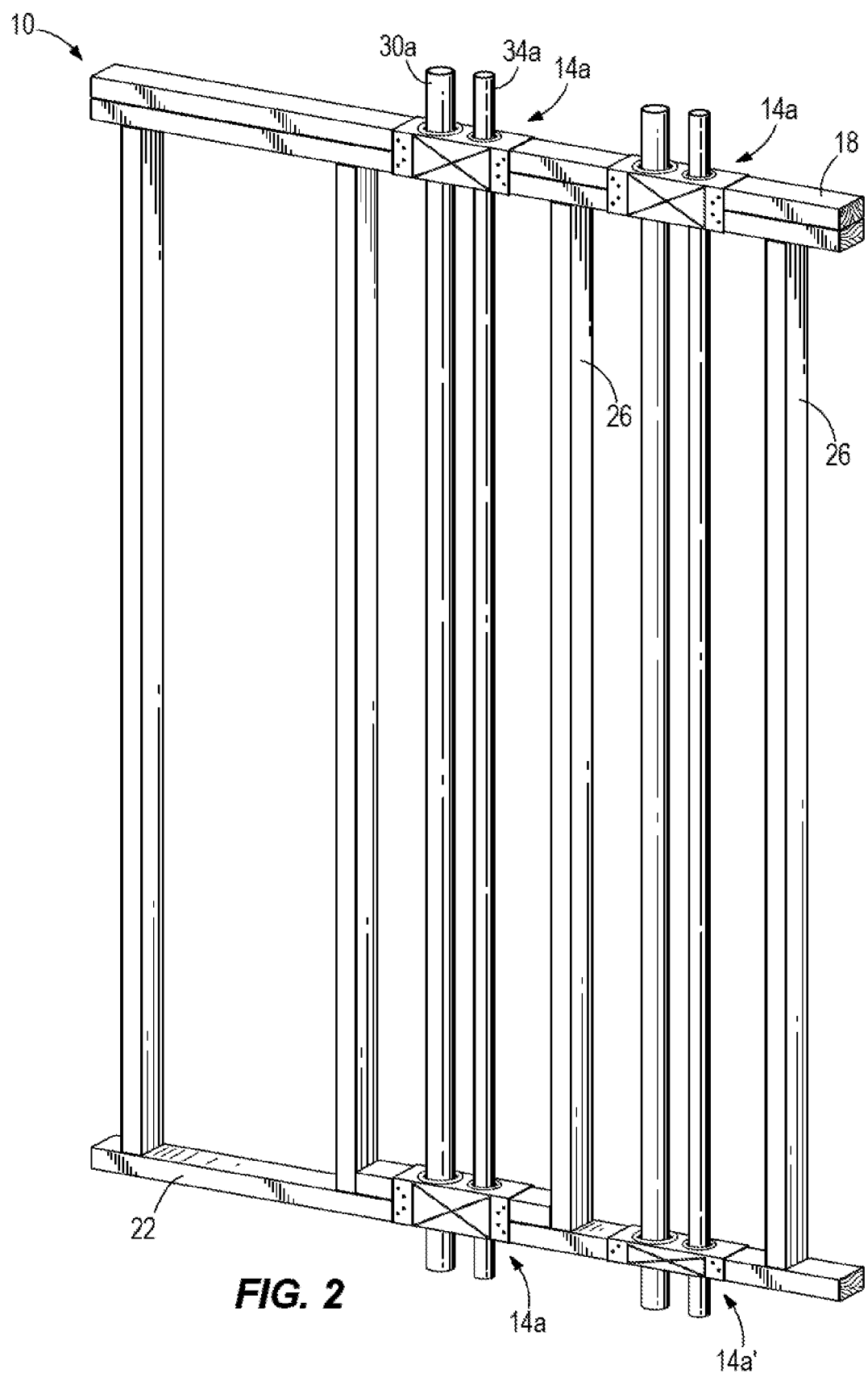
FIG. 2 is a perspective view of a portion of a wall frame including a pipe brace in accordance with an embodiment of the invention, illustrated holding two pipes having different diameters.

The pipes 30, 34 pass through the pipe braces 14 to help secure the pipes 30, 34 in a relatively fixed position, as well as to form an air-tight seal to inhibit airflow through the frame 10, which may increase the efficiency of air-conditioning units and also help increase fire safety. FIG. 1 illustrates the pipe braces 14, 14' configured to secure two pipes 30, 34, within the frame 10 that have relatively the same diameter. FIG. 2 illustrates another set of pipe braces 14a, 14a' configured to secure two pipes 30a, 34a within the frame 10 that have relatively different diameters. While further description and illustration are provided for the pipe brace 14, which secures two pipes 30, 34 with the same diameter, it is to be understood that the pipe brace 14 may be configured to secure various pipes of different sizes, types, orientations, etc. For example, typical pipes may be in the range of 0.5 inches to 5 inches in diameter. Furthermore, the pipe brace 14 could be configured to secure only one pipe, or more than two pipes.

Figure 3:
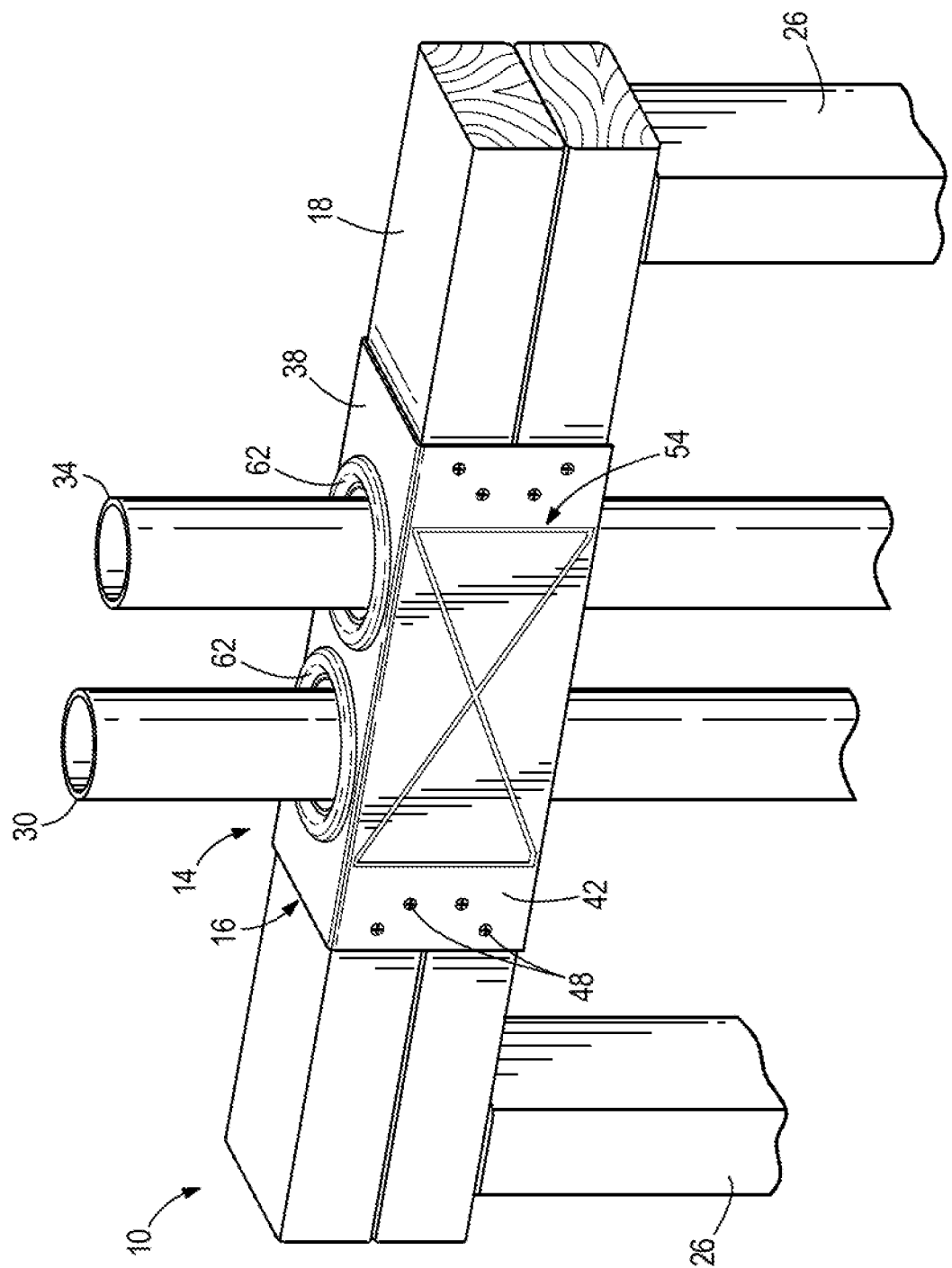
FIG. 3 is a perspective view of the pipe brace of FIG. 1, illustrated on a top frame member of a wall frame while holding two pipes.
Figure 4:
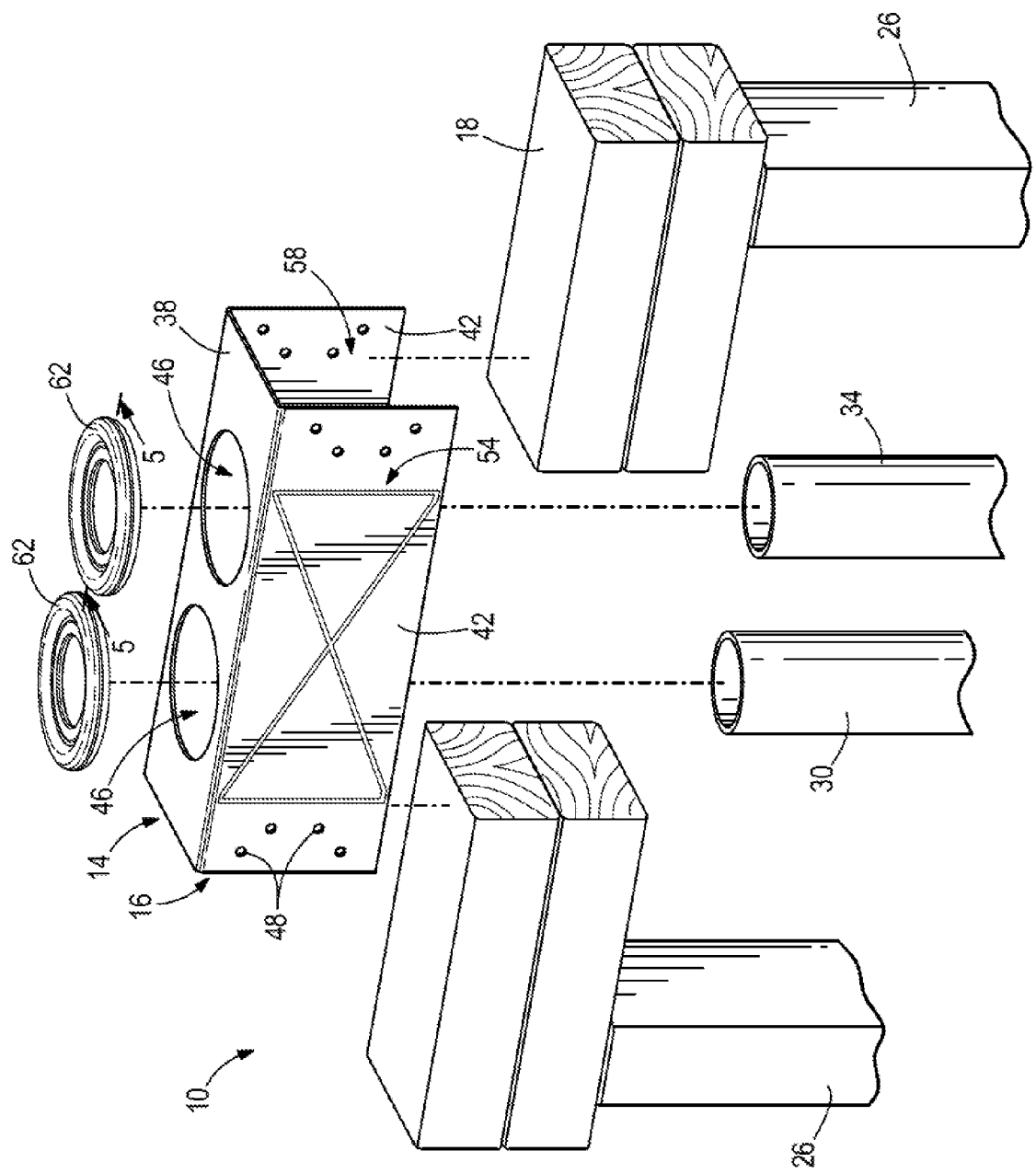
FIG. 4 is an exploded view of the pipe brace of FIG. 1.

In reference to FIGS. 3 and 4, the pipe brace 14 includes a structural member 16 having a horizontal first plate or wall 38 and one or more side plates or walls 42. The first wall 38 defines one or more apertures 46 (FIG. 4), which receives at least a portion of the pipes 30, 34. The illustrated side walls 42 extend perpendicularly from the first wall 38 and define a plurality of mounting holes 48, which are used to attach (e.g., nail, screw, etc.) the pipe brace 14 to the frame 10 during installation. The pipe brace 14 includes side walls 42 having a length corresponding to two 2"×4" wooden boards (e.g., approximately 3 inches), while the pipe brace 14' includes side walls 42 having a length corresponding to a single 2"×4" wooden board (e.g., approximately 1.5 inches). As an example, some load-bearing walls utilize two 2"×4" wooden boards on the top header 18 and the bottom header 22, while non-load-bearing walls utilize a single 2"×4" wooden board on the top header 18 and the bottom header 22. Therefore the appropriate pipe brace 14, 14', 14a, 14a' can be selected for a desired frame 10. Furthermore, if only a pipe brace 14, 14a is available for use, it is possible to use the pipe brace 14, 14a in a wall having only a single 2"×4" wooden header by adding an additional blocking 2"×4" wooden board in the area of the pipe brace 14, 14a (FIGS. 1 and 2). Further reference to a pipe brace will be made only to the pipe brace 14; however, it is to be understood that the description may apply equally to any of the pipe braces 14, 14', 14a, 14a'.

One or both of the side walls 42 may include an indicator or marking 54 (e.g., notch, score, painted line, etc.) that indicate to a user appropriate length of the support 18, 22, 26 to be cut out from the frame 10 for inserting the pipes 30, 34. The first wall 38 and the side walls 42 at least partially define a channel 58 (FIG. 4) that receives at least a portion of the frame 10 while installed. In the illustrated embodiment of FIGS. 1 and 2, the pipe brace 14 is installed in a right-side-up configuration (i.e., inverted "U" shape) such that the channel 58 receives a top portion or surface of the frame 10. Alternatively, the pipe brace 14 may be installed in an upside-down configuration (i.e., regular "U" shape) such that the channel 58 receives a bottom portion or surface of the frame 10. In an alternative embodiment, the pipe brace 14 may include only one side wall 42. The shape and size of the walls 38, 42 may also be varied in other designs. Further, additional structural elements (e.g., gussets, etc.) may be used to strengthen the pipe brace 14, and more specifically the structural member 16, if extra rigidity is required.

The pipe brace 14 also includes a gasket 62 to be received within each aperture 46. The gasket 62 engages a perimeter 66 (FIGS. 6 and 7) of the aperture 46 in a press-fit relationship, such that the gasket 62 will remain within the aperture 46 when the pipe brace 14 is in either the right-side-up or upside-down configuration, as described above. The gasket 62 includes an annular main body 70 having a generally circular cross-section and defining an annular recess 74 that receives at least a portion of the first wall 38 proximate the perimeter 66 of the aperture 46 to anchor the gasket 62 within the aperture 46. The annular main body 70 has an outer diameter D1 that is greater than the diameter of the aperture 46, which allows the portion of the first wall 38 to be received within the recess 74. The gasket 62 also includes an annular flange 78 extending radially inwardly from the annular main body 70. The annular flange 78 includes an inner diameter D2 that is smaller than an outer diameter D3 of the pipe 30, such that the annular flange 78 is bent in an axial direction (i.e., parallel to an insertion direction 82) when the pipe 30 is inserted into the aperture 46. The annular flange 78 can also include an annular notch 86 to increase the flexibility of the annular flange 78 by providing a crease or bend-point for the annular flange 78 to bend.

Figure 7:
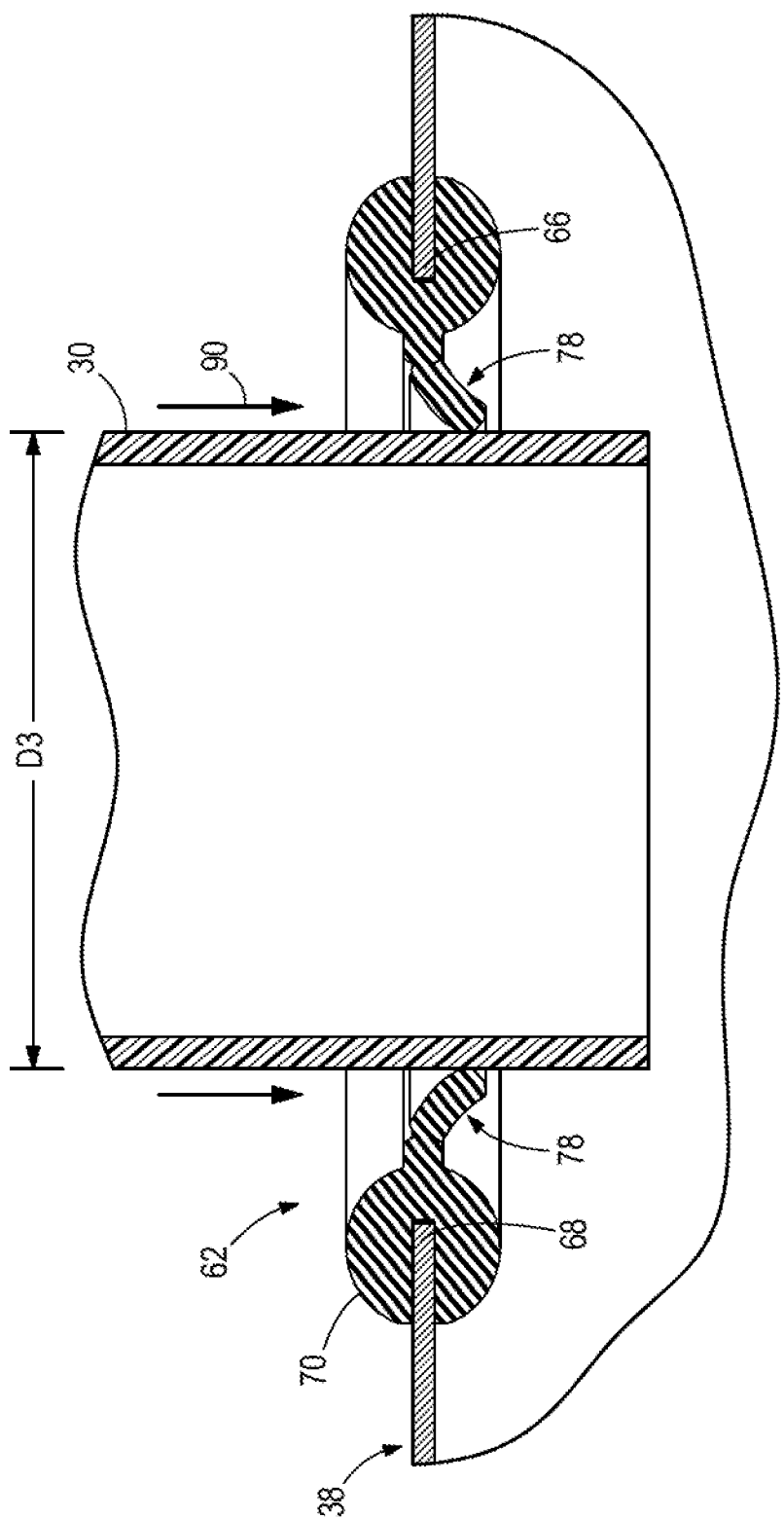
FIG. 7 is a cross-sectional view of the gasket of FIG. 5, illustrating bending movement of the annular flange when the pipe is inserted from a top side.

Additionally, or in the alternative, the annular notch 86 is provided as a means for removing (e.g., tearing, cutting, etc.) a portion of the annular flange 78 such that a larger pipe may be inserted through the gasket 62 without having to use a larger gasket. For example, a single gasket 62 can be designed to accommodate both a 1.5" PVC pipe (i.e., with the annular flange 78 intact) and a 2" PVC pipe (i.e., with the portion of the annular flange 78 removed using the notch 86). Alternatively, as shown in FIG. 2, different gaskets 62 having various different inner and/or outer diameters can be used to further accommodate different size pipes within the same pipe brace 14a. In this situation, the apertures 46 may also have different diameters. The gasket 62 is configured and retained in the aperture 46 so that the pipe 30 may be inserted into the aperture 46 and through the gasket 62 from either a first side of the aperture 46, in a first direction 82 (FIG. 6), or from a second side of the aperture 46, in a second direction 90 (FIG. 7). When the pipe 30 is inserted through the gasket 62, an air-tight seal is formed between the gasket 62 and the pipe 30 to inhibit airflow therebetween.

Additionally, the pipe brace 14 described above reduces the expansion noise between piping and the wood of the frame 10. For example, the pipes 30, 34 used in combination with the pipe brace 14 may be made of PVC or other suitable piping materials. The structural member 16 may be made of 18 gauge annealed steal, and the gaskets 62 may be made from ethylene propylene diene monomer (EPDM) rubber or fire-retardant silicon to allow the pipes 30, 34 to move during expansion and contraction without causing the noises associate with friction and direct engagement between wood framing and PVC. Alternatively, other suitable materials may be used in manufacturing the gasket 62.

Prior to installation of the pipe brace 14 onto the wall frame 10, the illustrated gasket 62 is press-fit into the aperture 46, preferably using a machine. Due to the desired tight and secure engagement between the illustrated gasket 62 and the aperture 46, it has been found that press-fitting via a machine works better than attempting to press-fit the gasket by hand.

During installation of the pipe brace 14, with the pre-assembled gasket 62, on the frame 10, a user first removes or cuts away a section of the support member 18 using a saw or any other suitable tool. The indicator 54 can be used by the user to facilitate making the appropriate cuts. Once the section of the support member 18 is removed, the user may place the pipe brace 14 over the cut-away section and align the mounting holes 48 in a desired orientation. The user then drives several fasteners (e.g., screws, nails, etc.) through the mounting holes 48, and into the support member 18, to firmly attach the pipe brace 14 to the frame 10. Once attached, one or more pipes 30, 34 are inserted through the apertures 46 from either the top or bottom thereof, deflecting the annular flange 78 of the gasket 62 as shown in either FIG. 6 or FIG. 7 to securely hold the pipes 30, 34 in place.

Further, the pipe brace 14 may also act as a suitable plate connector for load-bearing walls. For example, where plumbing, heating, and other pipes are placed in a load-bearing partition necessitating the cutting of plates, a metal tie of not less than 0.125 inches thick and 1.5 inches wide shall be fastened to the plate across to each side of the opening with not less than six 16d-type nails.

Various features and advantages of the invention are set forth in the following claims.

What is claimed is:

1. A pipe brace for securing a pipe passing through a frame of a wall, the pipe brace comprising:
   a structural member including a first wall defining an aperture and a second wall extending from the first wall, the first wall and the second wall at least partially defining a channel that receives at least a portion of the frame; and
   a gasket engaging a perimeter of the aperture in a press-fit relationship,
   wherein the pipe may be inserted into the aperture from either a first side or a second side of the aperture,
   wherein the gasket forms an air-tight seal with pipe to inhibit airflow, and
   wherein the gasket includes
      an annular main body having a generally circular cross-section and defining a recess that receives at least a portion of the first wall proximate the perimeter of the aperture to anchor the gasket within the aperture, and
      an annular flange extending radially inwardly from the annular main body.

2. The pipe brace of claim 1, wherein the annular main body includes an outer diameter greater than a diameter of the aperture.

3. The pipe brace of claim 1, wherein the annular flange includes an inner diameter smaller than an outer diameter of the pipe such that the annular flange is bent in an axial direction when the pipe is inserted into the aperture.

4. The pipe brace of claim 3, wherein the annular flange includes an annular notch to facilitate removal of a portion of the annular flange.

5. The pipe brace of claim 1, wherein the gasket is press-fit into the aperture by a machine.

6. The pipe brace of claim 1, wherein the structural member further includes a third wall extending from the first wall and partially defining the channel of the structural member.

7. The pipe brace of claim 1, wherein the aperture is a first aperture and the first wall further defines a second aperture.

8. The pipe brace of claim 7, wherein the gasket is a first gasket and further including a second gasket engaging a perimeter of the second aperture.

9. The pipe brace of claim 7, wherein the first aperture is larger than the second aperture.

10. The pipe brace of claim 1, wherein the gasket is made from EPDM or fire-retardant silicon.

11. The pipe brace of claim 1, further comprising an indicator on at least the first wall or the second wall to indicate to a user a location for cutting the frame.

12. The pipe brace of claim 1, wherein the recess is centrally located in the generally circular cross-section of the annular main body.

13. A pipe brace for securing a pipe passing through a frame of a wall, the pipe brace comprising:
   a structural member including a first wall defining an aperture, a second wall and a third wall each extending from the first wall, the first wall, the second wall, and the third wall at least partially defining a channel that receives at least a portion of the frame; and
   a gasket engaging a perimeter of the aperture in a press-fit relationship, the gasket including
      an annular main body having a generally circular cross-section and defining a recess that receives at least a portion of the first wall proximate the perimeter of the aperture to anchor the gasket within the aperture, the annular main body having an outer diameter greater than a diameter of the aperture,
      an annular flange extending radially inwardly from the annular main body and having an inner diameter smaller than an outer diameter of the pipe such that the annular flange is bent in an axial direction when the pipe is inserted into the aperture,
   wherein the pipe may be inserted into the aperture from either a first side or a second side of the aperture, and
   wherein the gasket forms an air-tight seal with pipe to inhibit airflow.

14. The pipe brace of claim 13, wherein the aperture is a first aperture and the first wall further defines a second aperture.

15. The pipe brace of claim 14, wherein the gasket is a first gasket and further including a second gasket engaging a perimeter of the second aperture.

16. The pipe brace of claim 13, wherein the gasket includes EPDM or fire-retardant silicon.

17. The pipe brace of claim 13, wherein the gasket is press-fit into the aperture by a machine.

18. The pipe brace of claim 13, further comprising an indicator on at least one of the first wall, the second wall, or the third wall to indicate to a user a location for cutting the frame.

19. The pipe brace of claim 13, wherein the annular flange includes an annular notch to facilitate removal of a portion of the annular flange.

20. The pipe brace of claim 13, wherein the recess is located in the generally circular cross-section of the annular main body.

* * * * *